(12) United States Patent
Schmidt

(10) Patent No.: US 9,862,258 B2
(45) Date of Patent: Jan. 9, 2018

(54) DOOR PROTECTION DEVICE

(71) Applicant: Randal Schmidt, Scandia, MN (US)

(72) Inventor: Randal Schmidt, Scandia, MN (US)

( * ) Notice: Subject to any disclaimer, the term of this patent is extended or adjusted under 35 U.S.C. 154(b) by 0 days.

(21) Appl. No.: 15/278,587

(22) Filed: Sep. 28, 2016

(65) Prior Publication Data

US 2017/0113530 A1 Apr. 27, 2017

Related U.S. Application Data

(60) Provisional application No. 62/245,539, filed on Oct. 23, 2015.

(51) Int. Cl.
*B60J 11/06* (2006.01)
*B60R 13/04* (2006.01)
*B60R 19/42* (2006.01)
*E06B 7/00* (2006.01)

(52) U.S. Cl.
CPC ............. *B60J 11/06* (2013.01); *B60R 13/04* (2013.01); *B60R 19/42* (2013.01); *E06B 7/00* (2013.01)

(58) Field of Classification Search
CPC ........... B60J 11/06; B60R 13/04; B60R 19/42
USPC .......................................................... 293/128
See application file for complete search history.

(56) References Cited

U.S. PATENT DOCUMENTS

| | | | |
|---|---|---|---|
| 3,243,223 A | 3/1966 | Hoshell | |
| 4,014,583 A * | 3/1977 | Forbes | B60J 11/06 293/128 |
| 4,401,331 A | 8/1983 | Ziner et al. | |
| 4,639,027 A * | 1/1987 | Boyd | B60J 5/042 280/770 |
| 4,708,380 A | 11/1987 | Cruz | |
| 4,750,767 A * | 6/1988 | Barnett | B60J 11/06 280/770 |
| 4,810,015 A * | 3/1989 | McNeil | B60R 13/04 150/166 |
| D312,237 S * | 11/1990 | Avery | D12/190 |
| 5,050,925 A * | 9/1991 | Brown | B60J 11/06 293/128 |
| 5,072,979 A * | 12/1991 | Swinton | B60J 11/06 280/770 |
| 5,129,695 A * | 7/1992 | Norman, II | B60J 11/06 280/770 |
| 5,188,407 A | 2/1993 | Villaveces et al. | |
| 5,312,145 A * | 5/1994 | McNeil | B60J 11/06 29/428 |
| 5,320,392 A * | 6/1994 | Hart | B60R 13/04 280/770 |
| 5,799,992 A * | 9/1998 | Kojima | B60J 11/06 280/770 |

(Continued)

*Primary Examiner* — Gregory Blankenship
(74) *Attorney, Agent, or Firm* — Patterson Thuente Pedersen, P.A.

(57) ABSTRACT

A removable vehicle exterior guard includes an elongate panel. The panel can comprise a foam pad comprising a flexible polymer, front foam pad attached to the front side of the foam pad and running the length of the foam pad, and one or magnetic strips attached to the back side of the foam pad and running the length of the foam pad. The device can comprise hinges, and the panel can have a first portion and a second portion connected by hinges. The device can comprise a theft deterrent system comprising a cord, attached to the panel at a proximate end and an anchor attached to the cord at a distal end.

19 Claims, 9 Drawing Sheets

(56) References Cited

U.S. PATENT DOCUMENTS

| | | | | |
|---|---|---|---|---|
| 6,062,617 | A * | 5/2000 | Marks | B60J 11/06 293/128 |
| 6,254,170 | B1 * | 7/2001 | Farmer | B60J 11/06 150/166 |
| 7,090,266 | B1 * | 8/2006 | Price | B60R 19/42 280/770 |
| 7,229,108 | B2 | 6/2007 | Hochrein | |
| 7,527,320 | B1 | 5/2009 | Nevell, Jr. | |
| 7,828,363 | B1 * | 11/2010 | Henry | B60J 11/06 296/136.07 |
| 8,162,383 | B2 | 4/2012 | Curtis | |
| 2003/0146630 | A1 * | 8/2003 | Ko | B60J 11/06 293/128 |
| 2006/0097528 | A1 * | 5/2006 | Southerland | B60J 11/06 293/128 |
| 2007/0085372 | A1 * | 4/2007 | Dhanray | B60J 11/00 296/136.07 |
| 2009/0151827 | A1 * | 6/2009 | Thompson | E06B 7/28 150/154 |
| 2012/0223513 | A1 * | 9/2012 | King, IV | B60J 11/06 280/770 |
| 2013/0147173 | A1 * | 6/2013 | Wohlberg | B60J 11/06 280/770 |
| 2015/0001865 | A1 * | 1/2015 | McGee, Sr. | B60J 11/06 293/128 |
| 2015/0258880 | A1 * | 9/2015 | Wheeler | B60J 11/06 293/127 |
| 2016/0090029 | A1 * | 3/2016 | Levytsky | B60J 11/04 340/473 |
| 2016/0365015 | A1 * | 12/2016 | Young | G09F 21/048 |
| 2017/0113530 | A1 * | 4/2017 | Schmidt | B60J 11/06 |

* cited by examiner

DOOR PROTECTION DEVICE

CROSS-REFERENCE TO RELATED APPLICATION

This application claims the benefit of U.S. Provisional Application No. 62/245,539 entitled "Door Protection Device" (filed Oct. 23, 2015).

TECHNICAL FIELD

Embodiments claimed herein relate to elements for body-finishing of vehicles, and more particularly to ornamental or guard strips such as door strip guards. In embodiments, removable vehicle exterior guards for a vehicle's door and side panel can provide unique and broad protection of the vehicle exterior from damage due to impact from other vehicle doors or objects.

BACKGROUND

Vehicle exteriors are vulnerable to damage when parked due to the risk of impact from other vehicles parking alongside and opening doors while parties enter or exit their vehicles, causing damage to the exterior of parked vehicle. This damage is also caused by impact from other objects such as two-wheel vehicles, and shopping carts. This risk is compounded by crowded parking lots, narrow parking spaces, angled parking spaces, as well as differences in vehicle types and sizes such as minivans, trucks, and sport utility vehicles, all with a variety of protruding shapes of the vehicle's door design. Conventional vehicle manufacturers provide minimal protective solutions generally consisting of narrow side-strip molding on some automobiles, while many manufacturers provide no exterior molding protection.

Conventional aftermarket side-exterior vehicle protection devices include a variety of molding strips, elongated tubing, or pads comprised of plastics, foam, or rubber materials. Such devices can fail to sufficiently protect the vehicle from damage. For example, a conventional molding strip may cover the furthest outward point of a vehicle's doors. Vehicles adjacent to the one being protected by the device, however, can have different contours and the furthest outward point of those adjacent vehicles could be relatively higher or lower. Because these lightweight strips are often permanently affixed to the vehicle door, it may be impossible to reorient the device to protect the vehicle. Such conventional lightweight, conformable strips or pads therefore often provide insufficient coverage.

Some conventional devices have large dimensions, covering a significant portion of the doors, and the width and length of the vehicle's side panels. These conventional devices, while providing more protection than the lightweight versions described previously, are burdensome to handle and manage and do not quickly attach to the vehicle. Both lightweight and bulkier versions of conventional aftermarket door protection devices suffer from poor coverage of the various protruding points of different vehicle makes and models. This is compounded by a variety of parking angles and positioning available in parking lots.

Although these problems have been recognized, no fully satisfactory solution has yet been produced. U.S. Pat. No. 4,401,331 ("Ziner") discloses linear, elongated molding with telescopic, spring-urged tubes that attach to vehicles. U.S. Pat. No. 3,243,223 ("Hoshell") also discloses a linear molding intended to be attached to an automobile door with telescopic tubes and attachment clips. Neither Ziner nor Hoshell, however, provides adequate vertical protection to a vehicle and both require time-consuming adjusting and attaching clips to the vehicle.

U.S. Pat. No. 8,162,383 ("Curtis") discloses a flexible, elongated molding with magnets for attachment to vehicle sides, and with emphasis on a self-coiling (slap-bracelet) piece inserted throughout the length of the main body molded piece, however the width and length reflected in drawings provides insufficient protection coverage for many vehicles and contemplated uses. Also, the size required for the self-coiling (slap-bracelet) piece within the elongated main body, particularly given the main body's thickness and density, causes the slap-bracelet to be cumbersome for one person to easily uncoil and lock into the desired flat shape. Furthermore, providing this device with the option of larger dimensions as suggested, increases the difficulty of conveniently uncoiling and locking flat to attach to a vehicle. Moreover, once uncoiled to the rigid, flat slap-bracelet position, the device will not conform over the shapes and curved ridges designed on many vehicle models. Additionally, the backside magnets are covered with a soft felt material, however this material is prone to mildew and deterioration in wet or humid outside weather conditions.

U.S. Pat. No. 4,810,015 to McNeil discloses elongated flexible panels with a soft cloth material covering the device's magnets, however the cloth material is also prone to deterioration and mildew. This device also utilizes elastic straps for attachment which will also deteriorate over time. Moreover, this device requires invasive holes drilled into the vehicle's wheel-wells for permanent attachment of metal hooks with lock nuts which disturbs the integrity of the sealed, encased wheel-wells, and the metal hooks are also prone to corrosion especially in these wheel-well locations.

U.S. Pat. No. 5,188,407 to Villaveces discloses an elongated magnetic-strip car protector with the main body having an inner layer of magnetic material and outer layer of shock-absorbing flexible material. This device provides inadequate width and length for optimal protection to a vehicle in many contemplated uses. Its edges are also required to be inserted into the crack of the vehicle door, restricting one's ability to optimally adjust the position of the device to best protect exposed areas of a vehicle's side-exterior according to a parking space or angle.

U.S. Pat. No. 5,072,979 to Swinton discloses a multi-hinged, folding device consisting of hard flat material such as plexiglass. This device is not flexible allowing it to contour to the vehicle's shape or to form over protruding parts. This device also does not provide one-size, universal use, and instead this device must be constructed in various sizes and shapes in order to accommodate each individual vehicle make and model.

U.S. Pat. No. 4,708,380 to Cruz discloses elongated strips of a semi-rigid material with a retainer strap at one end of the strip which is secured inside the vehicle. This device is limited in width and length for optimal, adjustable protection to a vehicle, and it protects essentially only a portion of the door it is attached to. It also is not flexible and therefore, as described with respect to the '979 patent to Swinton, does not allow for coverage of different curves of a vehicle's shape other than the one it was designed for.

Several other conventional vehicle-protection devices are cumbersome and time consuming to attach and remove. Such devices use hooks, suction cups, spring-loaded clips or strapping to adhere to the vehicle. These require a great deal of effort to properly attach, and can be difficult to conveniently store in one's vehicle due to the physical size when not in use. Several of these devices must also be constructed in a customized fashion as previously described in order to fit an intended vehicle and use.

As such, there is a need in the industry for a device that is capable of protecting an entire vehicle side panel and/or door(s), in a variety of settings and uses. Furthermore, there is a need for this device to be usable by a single person, without being overly cumbersome. Finally, it is desirable for the aforementioned systems to incorporate theft-deterrence systems, without making the system slow or unwieldy.

SUMMARY

According to embodiments, the device described and claimed herein provides unique and broad protective coverage that can be used nearly universally on vehicles having a variety of makes and models. In embodiments, a rectangular, impact-resistant, flexible, firm-holding, and removable vehicle exterior guard apparatus is described. Embodiments are both convenient to use and store when not in use, and also provide ample coverage of the areas to be protected. Furthermore, in embodiments a theft-deterrent system can be incorporated that prevents the device from being taken from the vehicle while in use, but is not burdensome to the user to engage or disengage.

In embodiments, a removable vehicle exterior guard device can comprise an elongate panel having a back side and a front side, and the back side can be adapted to contact the body of a vehicle when installed. The panel can comprise a foam pad comprising a flexible polymer, front foam pad attached to the front side of the foam pad and running the length of the foam pad, and one or magnetic strips attached to the back side of the foam pad and running the length of the foam pad.

In embodiments, the removable vehicle exterior guard device and also comprise one or more hinges arranged midway through the length of the panel and the panel can be divided into a first portion and a second portion. The two portions can be connected by the one or more hinges allowing the panel to fold flat for storage.

In embodiments, the removable vehicle exterior guard device can also include a theft protection system comprising a cord fixedly attached to the panel at a proximate end and an anchor fixedly attached to the cord at a distal end. The anchor can be sized and shaped such that it can prevent the panel from being removed from the vehicle when the vehicle door is closed. In embodiments, the anchor can be ring shaped.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
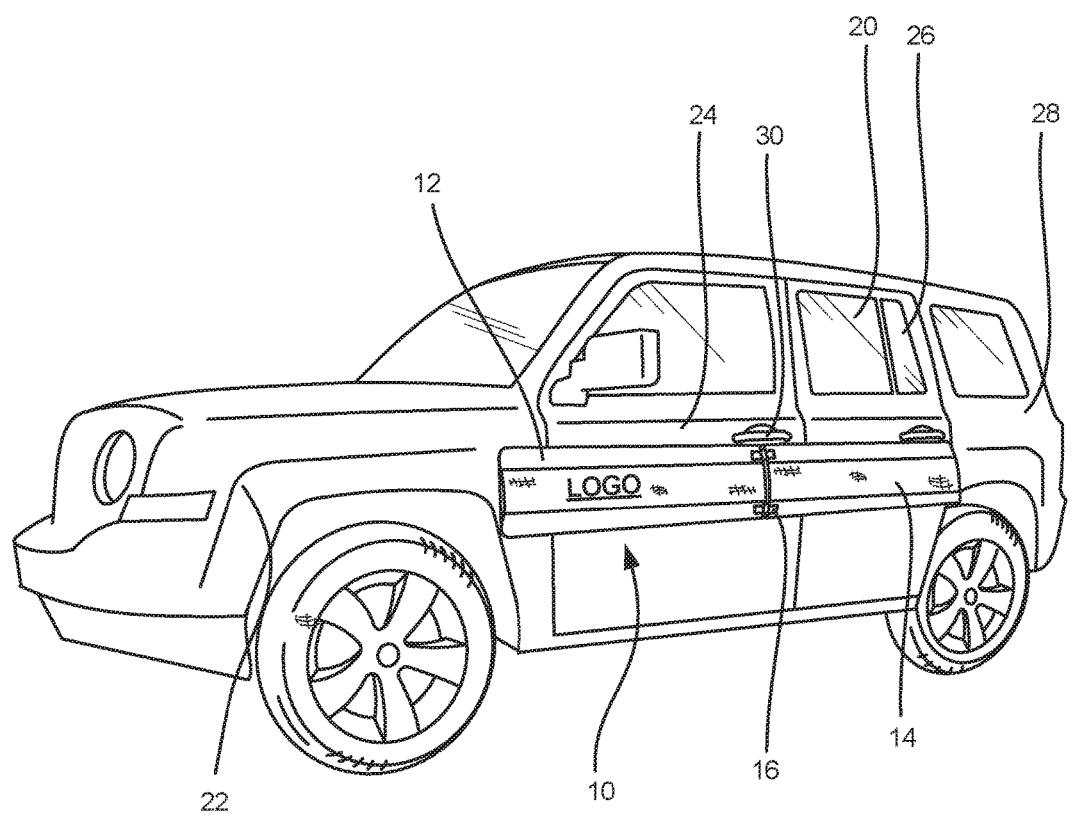
FIG. 1 is a perspective view of a panel attached to a vehicle according to an embodiment.

While embodiments are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

According to embodiments described herein, an improved vehicle exterior protection apparatus is easily installable and removable, and provides effective protection from impacts to vehicle exterior from other vehicle doors and objects while parked. The panel dimensions facilitate use on various vehicles of different sizes and shapes, including automobiles, trucks, and SUVs, with optimal and broader coverage than conventional vehicle impact-protection devices. The panels described herein can be constructed in a manner that provides a double-layered and conveniently slim impact-protective solution.

According to embodiments, a protector device has a width and length configured to comprehensively cover the exposed areas on sides of one and two-door cars, SUVs and trucks. The area covered by the protector can extend from front wheel-well vicinity to rear wheel-wheel vicinity of any particular vehicle. This device can be moved to a different portion of the vehicle, or applied to a different vehicle, for optimal protection according to the potential exposure to door-dents and scratches within the given parking space. Embodiments of the device described herein can be folded, rolled, or otherwise broken down or compressed to be stored easily when not in use. According to embodiments, an anti-theft device including a string having an object attached at the end remote from the remainder of the device can be incorporated.

FIG. 1 is a perspective view of a panel 10 according to an embodiment, wherein panel 10 is attached to a vehicle 20. As shown in FIG. 1, panel 10 includes fore portion 12 and aft portion 14 connected at a hinge 16. Panel 10 can be used to protect various parts of vehicle 20 at times, such as when vehicle 20 is left in a parking lot where other vehicles may be coming and going. Parts of vehicle 20 that can be particularly susceptible to damage include fore fender 22, front door 24, back door 26, and rear fender 28, each of which can be at least partially covered by panel 10.

Figure 2:
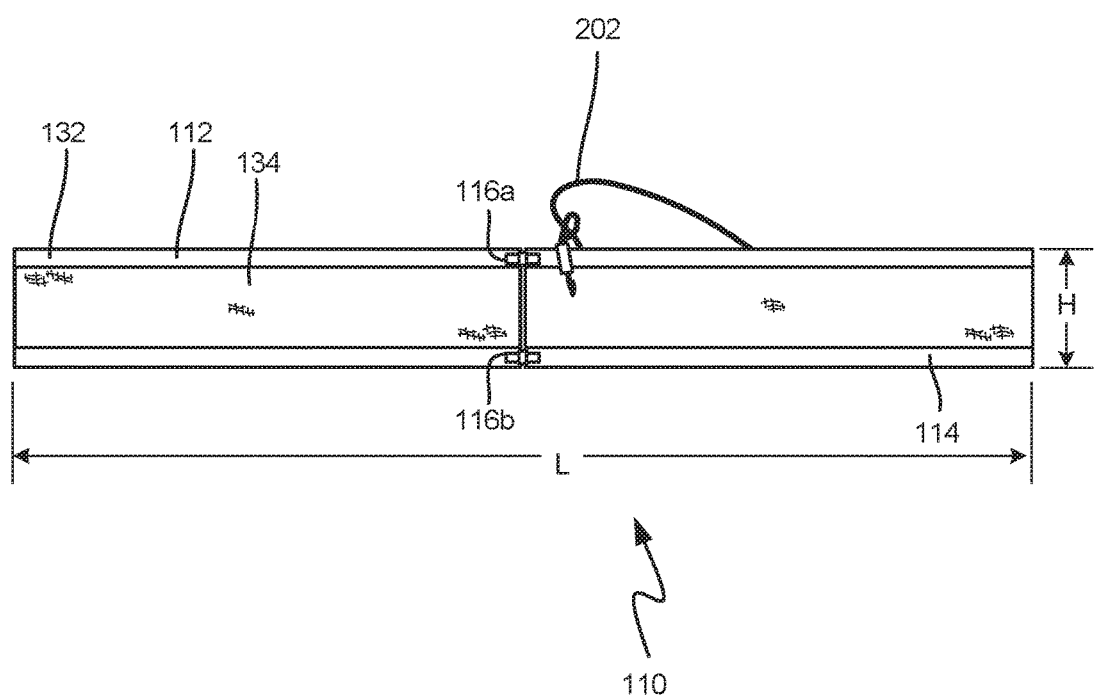
FIG. 2 is a schematic front view of a panel having a hinge according to an embodiment.

FIG. 2 is a schematic front view of a panel 110 having a first hinge 116a and a second hinge 116b. In general, parts of panel 110 that are similar to those previously depicted in FIG. 1 are labeled with similar reference numerals, iterated by 100. In particular, first portion 112 shown in FIG. 2 is substantially similar to fore portion 12 previously described with respect to FIG. 1, and second portion 114 shown in FIG. 2 is substantially similar to aft portion 14 previously described with respect to FIG. 1. Each portion of panel 110 can comprise EVA foam pad 132 and front foam pad 134.

Panel 110 can have a height of about 10 inches and a total width of about 80 inches, in one embodiment. EVA foam pad 132 can measure approximately 0.25 inches in thickness, for example, and can be provided at greater thickness if desired, while maintaining the necessary flexibility, magnetic hold, integrity, and handling of this device.

Front foam pad 134 can be adhered to the center of the panel front, and measure approximately 5 inches width and approximately 6 mm in thickness. Front foam pad 134 can run the length of EVA foam pad 132 or have shorter length, in embodiments. It is discovered that 6 mm thickness of foam sheet can provide effective adequate impact protection qualities, however front foam pad 134 may be of varied thickness.

The materials chosen for these sections can vary, in embodiments. In embodiments having both a front foam pad 134 and a foam pad 132, the materials used for each can vary in different embodiments. The primary large panel section (e.g., 132) can comprise flexible, lightweight, high-density, closed cell EVA foam, with tear-resistant qualities. The thickness can be ¼ inch, for example, which can be sufficient to provide desired impact-resistant qualities against common causes of damage to parked vehicles. In embodiments, the thickness of the primary large panel section (e.g., 132) can be increased, which will cause a concomitant increase in damage protection. For example, in embodiments the thickness of primary large panel section (e.g., 132) can be ½ inch thickness or more. Increased thickness of this panel can increase the weight of the overall device, and therefore larger or stronger magnetic backing may be used for very thick embodiments.

The secondary, smaller panel section applied to the front of the main panel can be made of flexible, lightweight, closed cell, and tear-resistant foam such as ethylene vinyl acetate (EVA) with thickness of about ¼ inch. This secondary, smaller panel can be made from medium-density consistency foamed polymer, in embodiments, or alternatively can be provided with high-density consistency. The closed cell EVA foam materials described are moisture and water resistant, and easy to clean. The foam can be treated with antimicrobial protection agents to prevent bacteria, mold and mildew, and prevent stains, odors, and aging breakdown in outdoor conditions.

The lightweight qualities of the closed cell EVA foam materials allow the device to be larger in width than other devices, yet easily handled while providing excellent protection. The described EVA foam material holds firmly to a vehicle in all weather conditions, using magnetic strips with approx 24 lb. of strength per linear foot in one embodiment. While intended to be applied only when parking, this device has been tested at driving speeds of 70 MPH and holds firmly to the vehicle. This firm and contouring hold is superior to other devices available.

The overall thickness of the device allows it to lay closely onto a vehicle's exterior, with minimal outward projection. This is advantageous because this low-profile device is unobtrusive and cannot be bumped, knocked or dislodged by people entering or leaving their vehicles in narrow parking spaces, as conventional protruding door-dent protection devices can.

Measurements were taken and observations made of multiple vehicles, ranging from year: 2000 to 2016, including 2-doors, 4-doors, SUVs and trucks to determine the most common vertical height range of door-dents from adjacent vehicles to the side-exterior of one's motor vehicle. It was found that the vast majority of door-dent damage from adjacent vehicles occurs within a vertical height range of 5" to 8" on the outer-extending side exterior of one's vehicle, and to a lesser extent, up to 10" vertical height range on the outer-extending side exterior. This strike-zone variance is due to adjacent vehicle heights and variety of door designs with distended points when opened, which results in a most common vertical strike-zone range of up to 10". As such, in embodiments the door protection device is designed with at least in 10" height to optimally protect from the vast majority of door-dent damage.

Measurements were also taken of multiple vehicles ranging from year 2000 to 2016, including 2-doors, 4-doors, SUVs and trucks to determine the horizontal-width range of door-dent incidents to vehicle side-exteriors. It was found that the vast majority of the horizontal-width range for door-dent damage occurs within a crucial sweet-spot area in the center mid-section of a vehicle's side-exterior of up to 46" width, and with a lesser but consistent amount of door-dent damage occurring up to approximately 17" to the left, and 17" to the right of this 46" crucial sweet-spot section, totaling an overall width of 80". This overall horizontal-width range is due to the variety of vehicle sizes, door placement, parking space angles, and positioning within parking spaces by drivers. Accordingly, in embodiments panel 110 can have a width of at least 46 inches, or in some embodiments of at least 80 inches.

Figure 3:
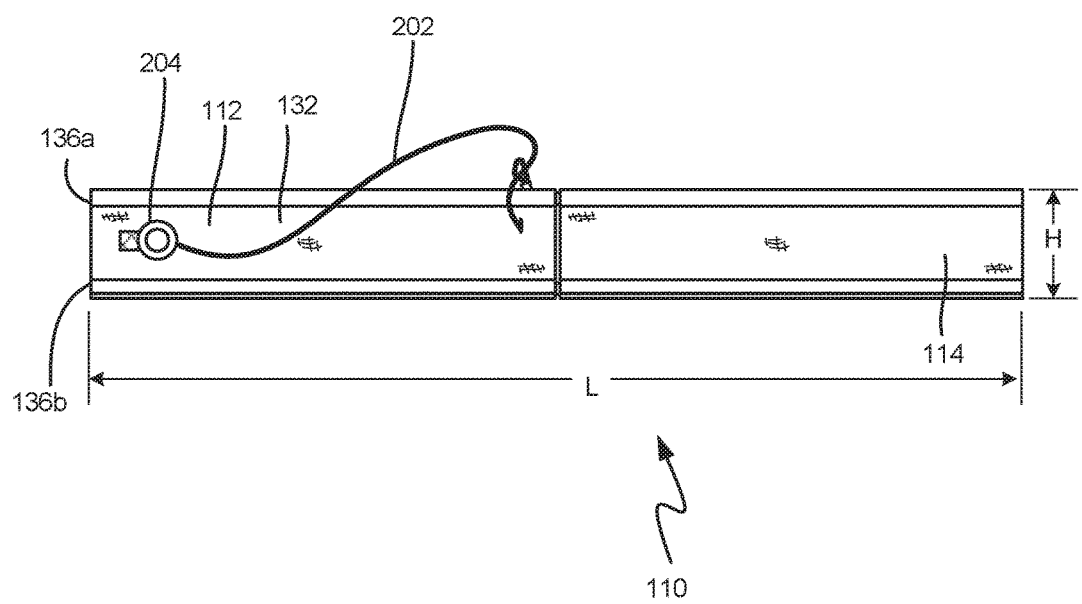
FIG. 3 is a schematic rear view of the panel of FIG. 2.

FIG. 3 is a schematic rear view of panel 110. Panel 110 can further comprise rear magnet strips 136a and 136b. Rear magnet strips 136a and 136b can run the length of EVA foam pad 132 and be approximately 2 inches in width and approximately 0.060 mm in thickness. Rear magnet strips 136a and 136b can comprise rubber-coated magnetic strips and be adhered to each of the upper and lower horizontal edges of EVA foam pad 132. It is discovered that 0.060 mm thickness of the magnetic strips can provide effective magnetic hold to vehicles and adequate impact protection qualities, however magnetic strips of varied thickness can be utilized.

It was also found that the average total horizontal-width between front and back wheel-well sections of all observed vehicles is reasonably close to 80", thereby allowing a protective device of up to 80" width as the optimal width for maximum protection for all vehicle types. As such, in some embodiments it is beneficial to provide crucial-area coverage at a width of 46" and overall coverage of 80" width, and this device offers more accurately determined dimensions for optimal protection from the vast majority of door-dent damage than other elongated protective devices.

FIG. 3 further depicts a security mechanism. In particular, cable 202 couples ring 204 to panel 110. As shown in FIG. 3, cable 202 loops through the body of panel 110 to prevent disengagement. Ring 204 can be positioned inside a closed door during use, and cable 202 can pass between the door and the door jamb. As described in more detail below, this arrangement prevents removal of panel 110 unless the door is unlocked and opened.

Also shown in FIG. 3, ring 204 can couple to panel 110. In embodiments, the back side of panel 110 (i.e., the side shown in FIG. 3) can be made of a material having sufficient tack or grip to hold ring 204. In alternative embodiments, a portion of the back surface of panel 110 can include a hook-and-loop, snap, magnetic, or other type of connected configured to engage with a counterpart on ring 204. In this way, ring 204 can be secured to panel 110 when not in use, for convenience of the user.

Figure 4:
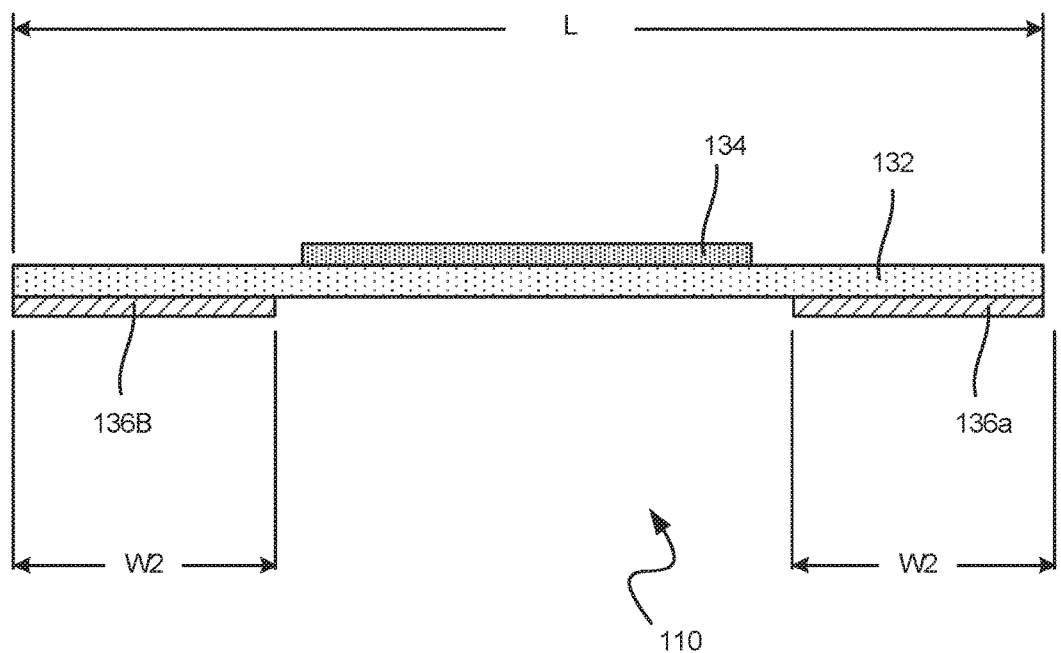
FIG. 4 is a schematic side view of the panel of FIGS. 2-3.

FIG. 4 is a schematic side view of panel 110. Front foam pad 134 can be centered vertically on EVA foam pad 132 and be arranged on EVA foam pad 132 distal to the surface of the vehicle. Rear magnet strips 136a and 136b can be arranged on EVA foam pad 132 proximate the surface of the vehicle. Rear magnet strips 136a and 136b can be arranged at near a top side and a bottom side of EVA foam pad 132. Rear magnet strips 136a and 136b can also be arranged near the middle of EVA foam pad 132, or be combined in a single magnet strip.

The materials used in panels or 110 can be flexible polymers, providing contouring and self-forming qualities in attaching panels to vehicles. The flexibility of these materials can facilitate curving and/or contouring over protruding door handles if necessary, while still effectively adhering to vehicle's side. Furthermore, first portion 112 and second portion 114 can include magnetic materials or backing, such that the panel 110 remains removably fixed to a metal substrate. As shown previously with respect to FIG. 1, the metal substrate can be the body of a vehicle.

The arrangement of the components of panels 10 and 110 can provide an overall staggered, front and back, double-layer of impact-protective materials covering the entire panel for the purpose of broad and effective protection. The front foam pad 134 and magnetic strips 136a and 136b can be attached to EVA foam pad 132 with industrial strength bonding adhesive which can provide for permanent hold in outdoor weather conditions.

In embodiments, front foam pad 134 can be relatively narrower than the gap between magnetic strips 136a and 136b. That is, the width of front foam pad 134, in combination with W1 and W2, is less than L.

Figure 5:
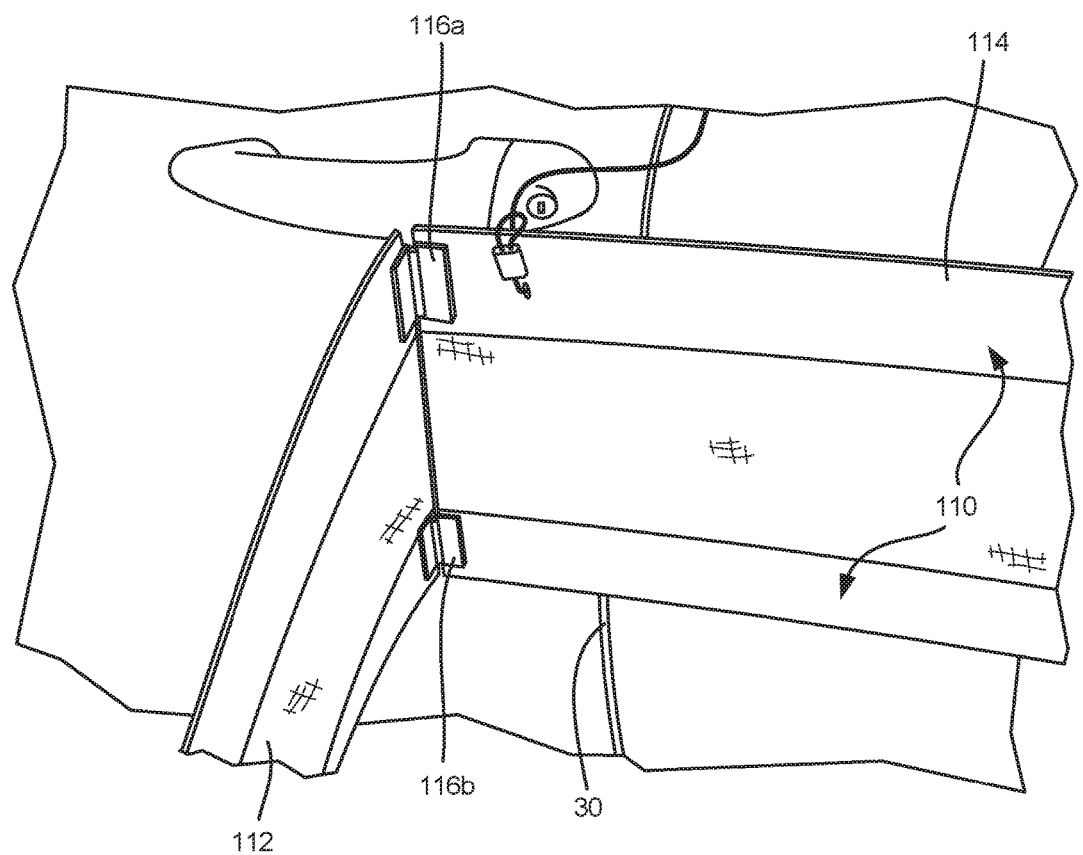
FIG. 5 is a perspective view of a flexible panel according to an embodiment.

FIG. 5 is a perspective view of a flexible panel according to an embodiment. As can be seen in FIG. 5, in operation, panel 110 can be applied to a vehicle such that the rear of panel 110 contacts the body of a vehicle. Panel 110 can flex in a direction normal to the plane defined by EVA foam pad 132.

As shown in FIG. 5, hinges 116a and 116b are bent, such that rear panel 114 is in contact with door 30, but front panel 112 is not. Hinges 116a and 116b allow panel 110 to be folded for easier storage, and unfolded to apply one side of panel 110 to door 30 at a time.

Also shown in FIG. 5, panel 110 is applied over discontinuous portions of door 30, such as a handle and a gap at the edge of door 30. In embodiments, the flexibility of panel 110 can be adjusted to contour sufficiently to the shape of door 30 or other desired surface to be protected, such that sufficient magnetic attraction is maintained to keep panel 110 from falling off.

Figure 6:
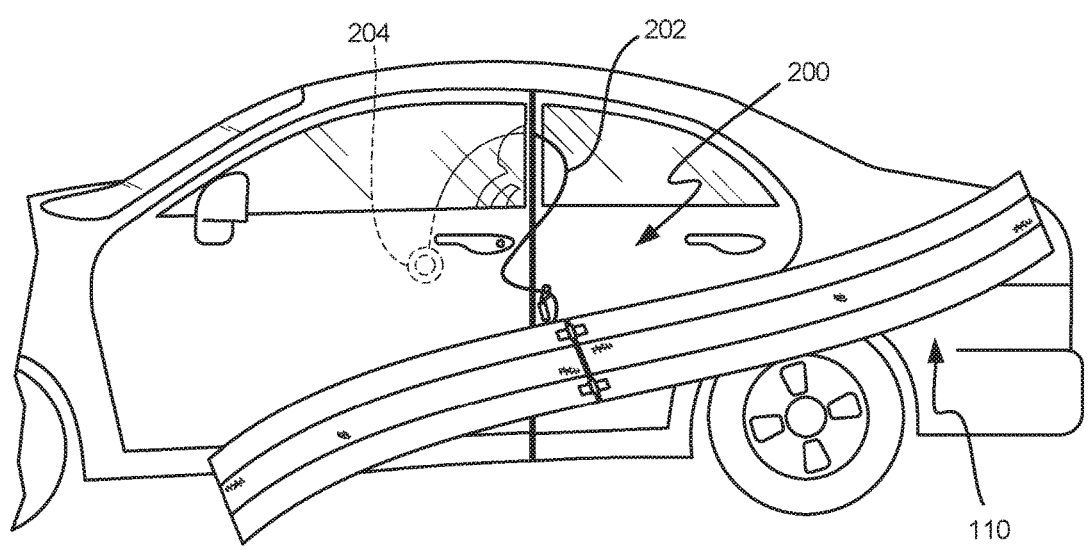
FIG. 6 is a schematic front view of the flexible panel of FIG. 5.

FIG. 6 depicts the operation of a security feature. As shown in FIG. 6, security feature 200 includes cable 202 and ring 204. In use, cable 202 is positioned partially inside and partially outside a vehicle, and attaches to panel 110. On the opposite end of cable 202 from panel 110 in the embodiment shown in FIG. 6 is ring 204. Ring 204 is too large to fit through the closed door of the vehicle, and therefore panel 110 cannot be removed easily by anyone except a person having a key to the vehicle.

Figure 7:
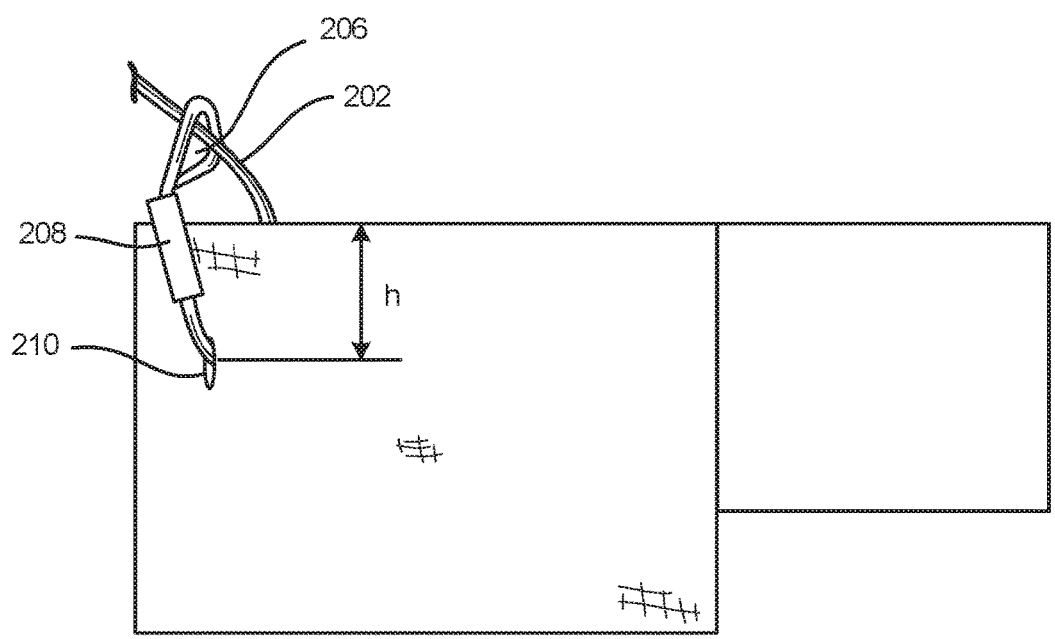
FIG. 7 is a cutaway perspective view of a security mechanism according to an embodiment.

FIG. 7 is a cutaway view of the engagement between security feature 200 and panel 110 of FIG. 6. As shown in FIG. 7, cable 202 loops through panel 110, at hole 210 positioned at height h from the edge of panel 110. Cable 202 is arranged in a loop 206 which returns to crimp 208, in the embodiment shown in FIG. 7. In alternative embodiments, other fasteners or arrangements could be used to position cable 202 to panel 110, as would be understood to one of skill in the art.

Figure 8:
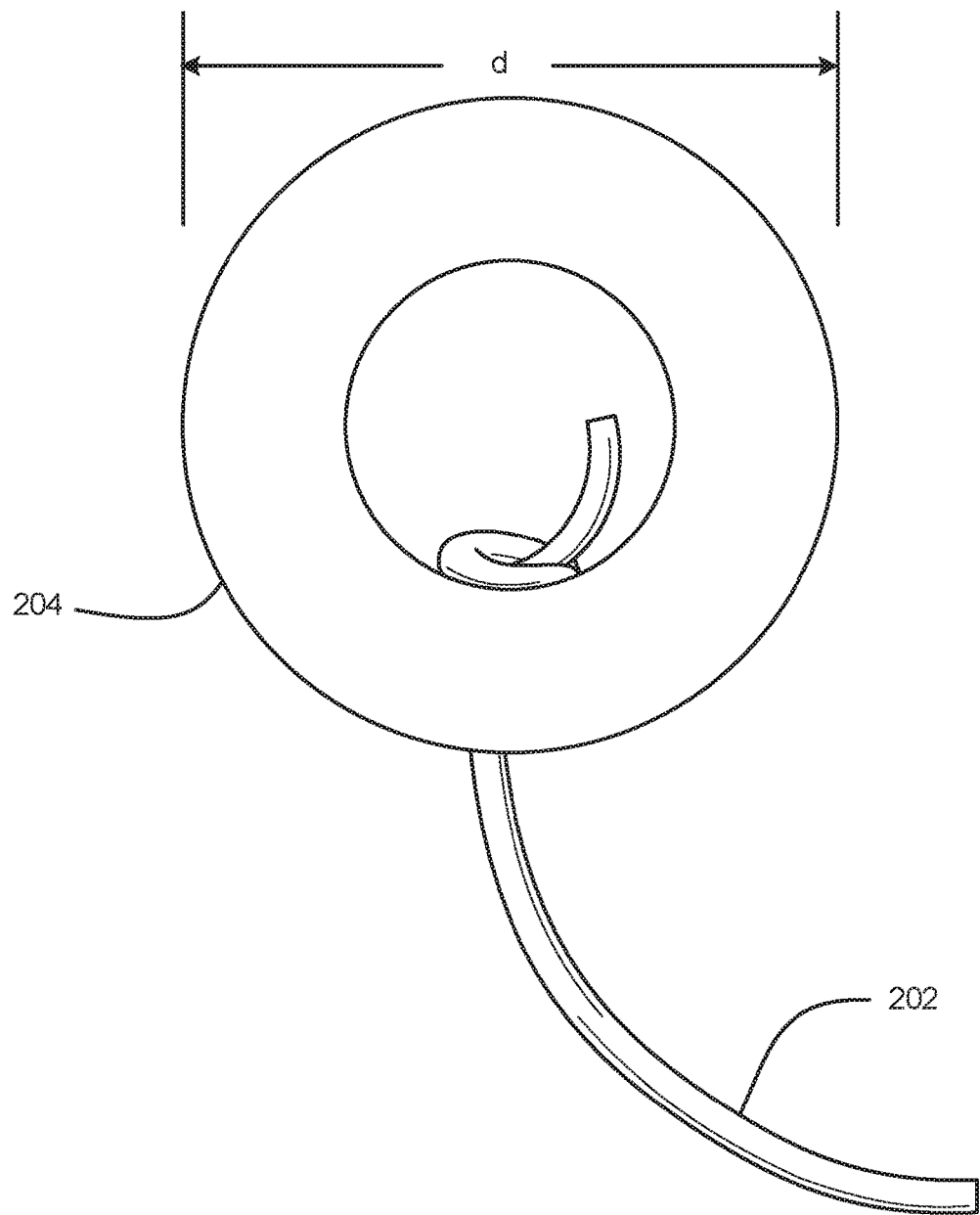
FIG. 8 is a cutaway perspective view of a security mechanism according to an embodiment.

FIG. 8 depicts the distal end of security feature 200. As shown in FIG. 8, cable 202 extends to ring 204, which has diameter d. In alternative embodiments, other shapes than a ring could be used. For example, in embodiments a ball or clip or other object can be implemented at the end of cable 202 that cannot be easily pulled through the closed door of a vehicle.

As one of skill in the art will recognize from the combined description of FIGS. 6 and 7, a user can deter removal of panel 110 by placing ring 204 inside a vehicle, shutting the door, and then positioning panel 110 on the side of the vehicle. In order to remove panel 110 from the vehicle, the door would have to be opened. Therefore, a user is very unlikely to lose panel 110 to theft, tampering, or other impact causing its removal.

Figure 9:
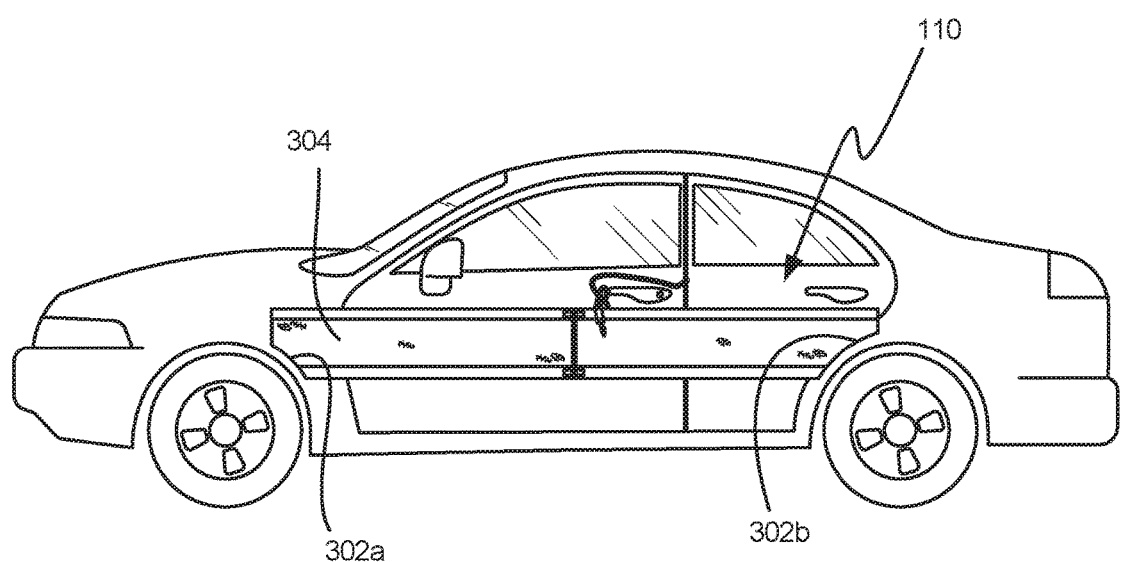
FIG. 9 is a plan view of an embodiment having contoured corners designed to complement a vehicle according to an embodiment.

FIG. 9 is a side view of a vehicle and an attached custom-cut panel 110 according to an embodiment. Custom-cut panel 110 includes half-panels 304, each having a clipped portion (302a, 302b). The clipped portions 302a, 302b correspond to the contours of the vehicle. In embodiments, different shapes and sizes of clipped portions can be used to match a variety of different vehicles or other objects to which custom-cut panels such as 110 are applied.

The materials can provide for customized trimming of dimensions if desired, especially at edges or corners, to conform to the dimensions and characteristics of user's vehicle. In embodiments, corners can be trimmed straight, or follow other contours as desired.

In alternative embodiments, there need not be hinges. For example, in embodiments a single panel without any articulations or hinges can extend along the entire desired length in which the vehicle is to be protected.

In operation, a panel can be applied onto side of vehicle by first placing the cord or cable and ring or other anchor described above inside of slightly opened vehicle door, and closing door over the cord or cable. Panels can then be applied to vehicle by placing one portion of hinged panel against vehicle at optimally desired position, allowing rubber coated magnetic strips to attach to vehicle, and laying remainder of panel onto vehicle into desired position. Alternatively, a single-panel embodiment can be positioned on the door directly. When thus installed, if the panel is removed from vehicle without opening the car door, the cord will be pulled taut, and the ring or other anchor can be prevented from exiting the car by the closed door. Therefore, the panel can remain attached to the vehicle until the car door is opened.

It will be clear to one skilled in the art that the present disclosure provides numerous advantages over conventional devices. The construction of this device provides impact-resistant materials on both front side and back side of the panels, with an overall double-layer of front and back materials, providing a sleeker, thin product than other devices for optimal protection from door-dings and scratches from other vehicles and objects. The length and width of the disclosed devices, with the impact resistant and flexible qualities, provides necessary, effective protection, and the disclosed devices offer such with less thickness and bulk than other devices. The movable nature of the devices of the present disclosure can also enhance protection. For example; angled parking spaces may require the panel to be moved up to approximately two feet either toward the front or rear section of the vehicle for optimal protection from adjacent vehicle's doors, and the disclosed devices can easily be shifted accordingly.

The disclosed devices can contain flexible materials comprised of high density EVA foam strips, reinforced with a front foam sheet, both with contouring qualities in attaching to vehicles. This flexibility allows panels to curve and contour over protruding door handles if necessary while effectively adhering to vehicle's side. The materials of the disclosed devices allow customized trimming of the edges or corners of panels if desired, for example; trimming a corner of panel that extends past the wheel-well opening of a single-door vehicle in order to better match the panel's dimensions to those of the vehicle. The materials of the disclosed devices also allow for application of graphic designs to enhance attractiveness when in use. The flexible qualities and materials of this invention allow for quick and convenient application and removal, as well as compact storage in one's vehicle or trunk when folded flat in half, or when rolled.

The disclosed devices can also contain a theft-deterring, vinyl-coated cable security system, whereby the insolated cable is secured to the panel, with a rubber anchor ring secured on the opposite end of the cable, allowing the security cable and anchor ring to be easily placed inside of vehicle. The secure cable and rubber anchor ring materials are flexible and pliable, and can be less likely to scratch the vehicle or vehicle parts, and result in less time and effort than other products to secure the panel when applying it to the vehicle.

Conventional devices offer insufficient solutions for flexible, contouring protection devices that can conform to a vehicle's curves and shapes. Conventional devices also offer minimal ability to modify the placement of the device in position on the side of vehicle according to the variety of exposed areas each time the vehicle is parked next to the wide range of adjacent vehicle sizes, heights, door shapes and designs. The wide range of parking lot spacing and angles causes an equally wide range of damage horizontally (left to right) from the doors of other vehicles to one's own vehicle. The disclosed embodiments can provide the ability to significantly modify the position of the panel, both vertically and horizontally, to accommodate for necessary protection.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. §112(f) are not to be invoked unless the specific terms "means for" or "step for" are recited in a claim.

What is claimed is:

1. A vehicle body protection device including:
   a panel formed of a conformable, foamed polymeric material, the panel having a magnetic backing;
   a secondary foamed polymeric body adjacent the conformable, foamed polymeric body and opposite the magnetic backing, wherein the secondary foamed polymeric body is smaller than the conformable, foamed polymeric material;
   a cord having a proximal end and a distal end, wherein the cord is affixed to the panel at the proximal end; and
   an anchor affixed to the cord at the distal end.

2. The vehicle body protection device of claim 1, wherein the panel comprises two sub-panels each extending along a respective primary length, and wherein the two sub-panels are mechanically coupled to one another by a fixed hinge such that the primary length of a first panel of the two sub-panels is parallel to the primary length of a second panel of the two sub-panels when the fixed hinge is in either an open position or a closed position.

3. The vehicle body protection device of claim 2, wherein the plurality of sub-panels are mechanically coupled to one another by a plurality of hinges that includes the hinge.

4. The vehicle body protection device of claim 1, wherein the anchor is a ring.

5. The vehicle body protection device of claim 1, wherein the cord is configured to fit between a door and a doorjamb of a vehicle, and wherein the anchor is not configured to fit between the door and the doorjamb of the vehicle.

6. The vehicle body protection device of claim 1, wherein the panel includes a foamed polymeric body having the magnetic backing.

7. The vehicle body protection device of claim 1, wherein the foamed polymeric body comprises ethylene vinyl acetate (EVA).

8. The vehicle body protection device of claim 2, wherein the sub-panels are configured to fold adjacent to one another when the hinge is in a first position, and wherein the sub-panels are configured to extend away from one another from the hinge when the hinge is in a second position.

9. The vehicle body protection device of claim 1, wherein the panel comprises a shape corresponding to a contour of a vehicle.

10. The vehicle body protection device of claim 2, wherein the two sub-panels are each configured to correspond to a portion of a contour of a vehicle.

11. The vehicle body protection device of claim 1, wherein the cord is affixed to the panel by looping through the panel at a height from an edge of the panel.

12. The vehicle body protection device of claim 1, wherein the panel is sufficiently flexible to match a contour of a vehicle.

13. The vehicle body protection device of claim 1, wherein the panel has a height of at least 8 inches.

14. The vehicle body protection device of claim 13, wherein the panel has a height of at least 10 inches.

15. The vehicle body protection device of claim 1, wherein the panel has a width of at least 46 inches.

16. The vehicle body protection device of claim 15, wherein the panel has a width of at least 80 inches.

17. A method for applying a door protection device to a vehicle, the method comprising:
   opening a door of the vehicle;
   placing an anchor of the door protection device and at least a portion of a cord of the door protection device inside the vehicle;
   closing the door of the vehicle over the cord of the door protection device to prevent egress of the anchor from the vehicle;
   positioning a panel of the door protection device on the door, wherein the panel can reversibly adhere to the door, wherein the panel of the door protection device is formed of a conformable, foamed polymeric material, the panel having a magnetic backing;
   wherein the door protection device further includes a secondary foamed polymeric body adjacent the conformable, foamed polymeric body and opposite the magnetic backing, wherein the secondary foamed polymeric body is smaller than the conformable, foamed polymeric material;
   wherein the cord has a proximal end and a distal end, and the cord is affixed to the panel at the proximal end; and
   wherein the anchor is affixed to the cord at the distal end.

18. The method of claim 17, wherein the magnetic backing causes the reversible adhesion to the door.

19. The method of claim 17, wherein the door protection device comprises two sub-panels each extending along a respective primary length, and wherein the two sub-panels are mechanically coupled to one another via a fixed hinge such that the primary length of a first panel of the two sub-panels is parallel to the primary length of a second panel of the two sub-panels when the fixed hinge is in either an open position or a closed position, and wherein each of the sub-panels is configured to reversibly adhere to the door.

* * * * *